455-509 AU 233 EX
FIP8106 XR 3,604,936

United Stat[redacted]

[11] 3,604,936

[72] Inventor Rudolf Kompfner
Middletown, N.J.
[21] Appl. No. 754,010
[22] Filed Aug. 20, 1968
[45] Patented Sept. 14, 1971
[73] Assignee Bell Telephone Laboratories, Incorporated
Murray Hill, N.J.

[54] OPTICAL TIME DIVISION SWITCHING SYSTEM
13 Claims, 8 Drawing Figs.

[52] U.S. Cl. .......... 250/199
[51] Int. Cl. .......... H04b 9/00
[50] Field of Search .......... 250/199; 331/94.5; 179/15 A; 332/7.51; 350/150, 157, 160

[56] References Cited
UNITED STATES PATENTS

| | | | |
|---|---|---|---|
| 2,689,949 | 9/1954 | Kalbach et al. | 250/199 |
| 3,363,103 | 1/1968 | Fowler et al. | 250/199 |

*Primary Examiner*—Robert L. Griffin
*Assistant Examiner*—Albert J. Mayer
*Attorneys*—R. J. Guenther and James Warren Falk

ABSTRACT: An optical time division switching system is described in which coherent light from a laser is successively applied to a group of modulators controlled by electrical signals from corresponding stations. The light from each modulator is selectively delayed for transmission to another station in the group and then sequentially combined into a single light beam. This light beam is applied to a group of detectors wherein the light is successively demodulated in accordance with the selectively delay sequence. The electrical signals from each detector are connected to their corresponding stations to complete the desired communication paths.

INVENTOR
R. KOMPFNER
BY J S Cubert
ATTORNEY

OPTICAL TIME DIVISION SWITCHING SYSTEM

BACKGROUND OF THE INVENTION

My invention is related to communication systems and, more particularly, to optical time division switching arrangements utilizing coherent light.

Communication systems involving interconnections among a group of stations generally require a number of transmission paths. It is often desired, however, to use a single transmission path to provide a plurality of concurrently operating communication channels. This is done in a time division switching system by making each channel operative in a distinct one of a repetitive group of time slots. During each time slot, the signal from a station associated with the operating channel is sampled; the sampled signal is transferred over the common transmission path; and the signal is received by another station selectively interconnected through the channel.

The bandwidth of the time division switching system determines the information-carrying capacity of the system. This bandwidth is related to the sampling rate and to the time required to switch from one channel to another. The channel-switching time is limited by the nature of the transmission path and the characteristics of switching devices used. It has been recognized that the bandwidth of a communication system in which the carrier is coherent light is inherently broader than that of electrical systems used for the same purpose. This extended bandwidth may be employed in time division switching to improve the interconnection capabilities of a time division multiplex arrangement. The extended bandwidth of a coherent light system has made it possible to utilize light pulses which are much shorter in duration than pulses commonly used in electrical time division switching systems. Because of the short duration light pulses and the rapid response of an optical transmission path, an increased sampling rate is attainable. Thus, the number of concurrently operated channels can be significantly increased or, alternatively larger bandwidth signals may be accommodated.

In one type of previously proposed coherent light time division multiplexing scheme, the multiplexing and demultiplexing of modulated signals is accomplished in electrical devices wherein the signals lack an optical carrier. In this arrangement, the multiplex switching is limited by the bandwidth of the electrical devices rather than the coherent light transmission. In another scheme, the multiplex switching is accomplished by interleaving optically modulated coherent light pulses originating from separate pulsed lasers. The duration of such modulated pulses is dependent on the characteristics of the separate lasers and these characteristics and their variability substantially limit the sampling rate so that the information carrying capacity of such a system is limited.

SUMMARY OF THE INVENTION

My invention is an optical time division switching system which uses a plurality of adjustable delay elements to selectively interconnect pairs of stations of a communication system in sequence via a common coherent light transmission path. Coherent light is applied in a repetitive sequence of time slots to a group of modulators, each being associated with one station. The electrical signals from the station control the amount of coherent light passing through the associated modulator. In accordance with my invention, the coherent light from each modulator in a time slot is applied to a delay element which delays the light pulse for a selected number of time slots. The light pulses from all the delay elements are then sequentially combined into a common light beam that is applied to a group of detectors associated with the stations. The detectors demodulate the light in subsequent time intervals in accordance with the delayed sequence. The received light is converted into electrical signals in the detectors, and these electrical signals are transmitted to the interconnected station of the station pair.

According to one aspect of the invention, the coherent light beam generated by a continuous wave laser is conically rotated and angularly deflected so that it describes a circular path. Modulators located on the circumference of the circular path sequentially receive the light beam in distinct time slots of repetitive cycles in accordance with the angular velocity of the beam and modulate the beam with signals from the corresponding stations.

In one illustrative embodiment of this aspect of my invention, the continuous coherent light beam is conically rotated and deflected in a first deflector so that the rotating beam describes a circular path, the beam being transmitted in a direction parallel to that of the generated beam. Electro-optic modulators spaced along the circumference of the aforementioned circular path sequentially receive the rotating beam in the distinct time slots and transmit modulated light pulses to electro-optic delay elements are optically aligned to the modulators. The delay elements are controlled by a common arrangement so that each modulated light pulse is received by a detector associated with the interconnected station.

The modulated light pulses from all the delay elements are angularly deflected onto a reflecting cone in accordance wit the delayed sequence. The cone is arranged so that the reflected light pulses in the direction of the desired transmission path are sequentially combined to a common light beam. This common light beam is conically rotated in a second deflector operating in synchronism with the first conical deflector and caused to impinge on a circular array of detectors. The detectors convert the modulated light pulses separated by the second deflector into electrical signals and these signals are transmitted to the stations of the system in accordance with the delayed sequence. In this manner, signals are exchanged between interconnected pairs of stations through a coherent light time division switching system.

In another illustrative embodiment of this aspect of may invention, the common light beam from the reflecting cone is applied to a single photodetector. The signal from the photodetector is amplified and applied to an electro-optic modulator. This electro-optic modulator receives coherent light from a second continuous wave laser. The intensified modulated light beam so generated is conically rotated and sequentially applied to a circular array of photodetectors so that pairs of stations are selectively interconnected.

According to another aspect of this invention, the coherent light is generated in a pulsed-type laser which transmits narrow coherent light pulses at a predetermined repetition rate to a group of modulators through a path consisting of a succession of reflecting elements arranged so that the modulators receive the light pulses in a predetermined sequence.

In an illustrative embodiment of this aspect of my invention, a laser oscillator is internally modulated to produce repetitive coherent light pulses. Each light pulse is passed through a number of totally reflective and half reflective mirrors arranged ad spaced so that the light pulse is successively applied to each one of a group of electro-optic modulators in a predetermined sequence. Each modulated light pulse is then selectively delayed in an electro-optic delay element associated with a modulator and all the delayed modulated light pulses are combined in a common light beam in the direction of the desired transmission path. The forming of the common light beam is accomplished in an arrangement of totally reflective and half-reflective mirrors which arrangement provides an equal delay for each modulated light pulse.

The common light beam is then transmitted along a first transmission path and is applied to a succession of totally reflective and half reflective mirrors which cause the light beam to be applied simultaneously to a group of photodetectors corresponding to the modulators. A portion of the light pulse from the internally modulated laser is transmitted along a second transmission path and sequentially applied to the photodectors through another arrangement of totally reflective and half reflective mirrors in said predetermined sequence. The photodetectors are responsive to the concurrent application of the light pulses from the modulators and delay elements and the light pulses from the second transmission path. In this way, the detectors are enabled in the proper sequence so that the received modulated light pulses are converted into electrical signals which are transmitted to the stations in accordance with the desired interconnection scheme.

DETAILED DESCRIPTION

Figure 1:
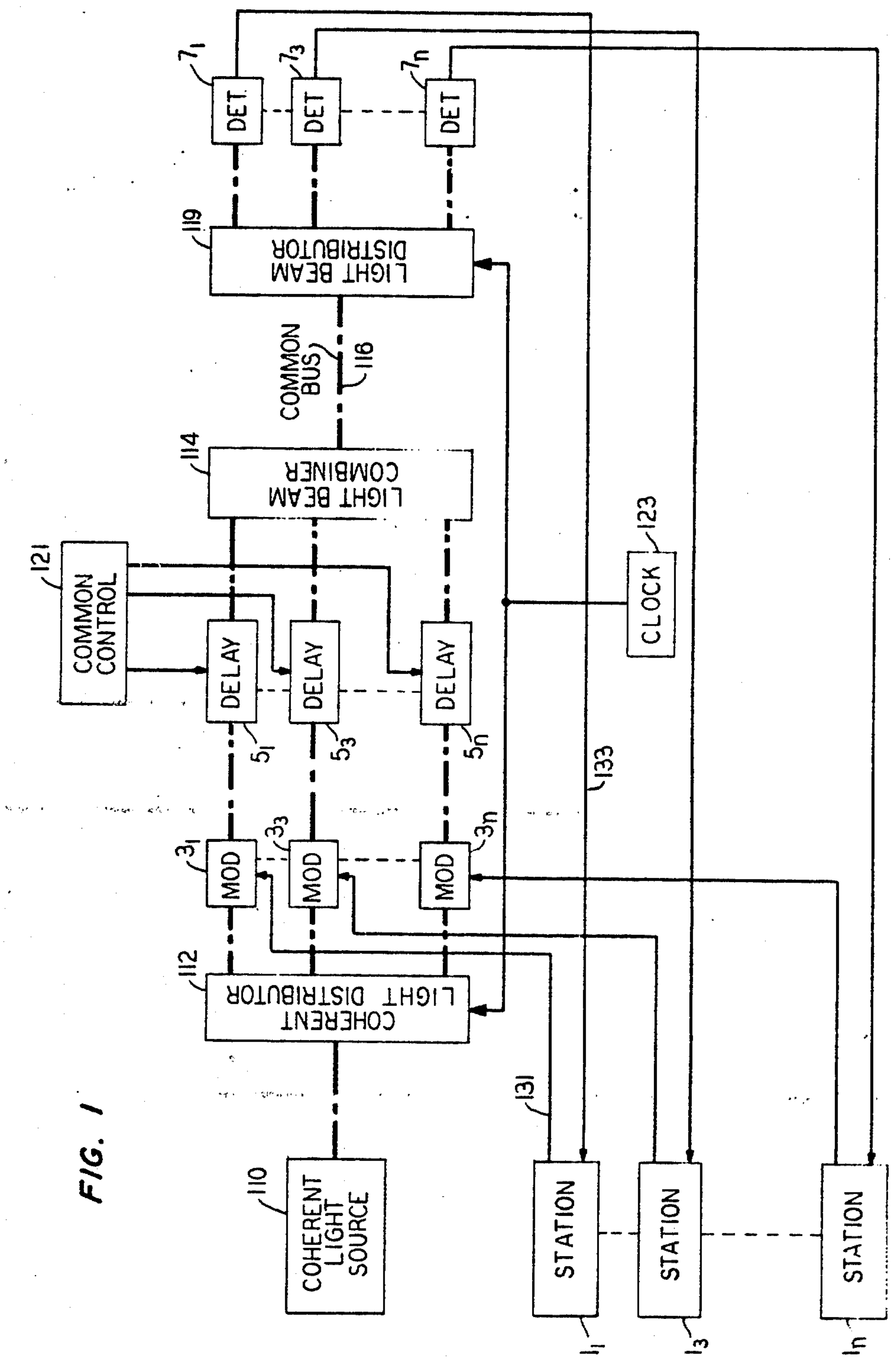
FIG. 1 depicts a general block diagram of an optical time division switching system according to my invention.

FIG. 1 shows a block diagram of an optical time division switching system wherein coherent light is modulated by electrical signals from a group of stations $1_1$ through $1_n$ and the modulated coherent light is applied via light beam distributor 119 to a group of detectors $7_1$ through $7_n$ after being modulated, selectively delayed, combined into a common beam and transmitted over common bus 116. The output of detectors $7_1$ through $7_n$ are then applied to stations $1_1$ through $1_n$ so that pairs of stations from this group are selectively interconnected.

Coherent light is generated in coherent light source 110 and applied to coherent light distributor 112. Distributor 112 sequentially applies the coherent light to modulators $3_1$ through $3_n$ in successive time intervals each consisting of a repetitive group of time slots. The modulating signals from stations $1_1$ through $1_n$ are applied to modulators $3_1$ through $3_n$, respectively, so that the incident coherent light passes through each modulator in its respective time slot and is applied to the associated one of delay elements $5_1$ through $5_n$. The delay elements arrange the modulated light pulses from modulators $3_1$ through $3_n$ in a selected sequence. The output light from the delays are combined in light beam combiner 114 to form a common light beam which retains the aforementioned selected sequence.

Common control 121 selectively controls the delay of each delay element so that the light from the delay elements may be applied to the detectors in a selected manner. If, for example, it is desired to transfer signals from station $1_1$ to station $1_n$, the modulated light output of modulator $3_1$ is applied to delay $5_1$ which, in response to control 121, delays this light for $n-1$ time slots so that this light impinges on detector $7_n$ after passing through combiner 114 and distributor 119. By selectively controlling the delays of each of delay elements $5_1$ through $5_n$, signals may be exchanged between selected pairs of stations.

Figure 2:
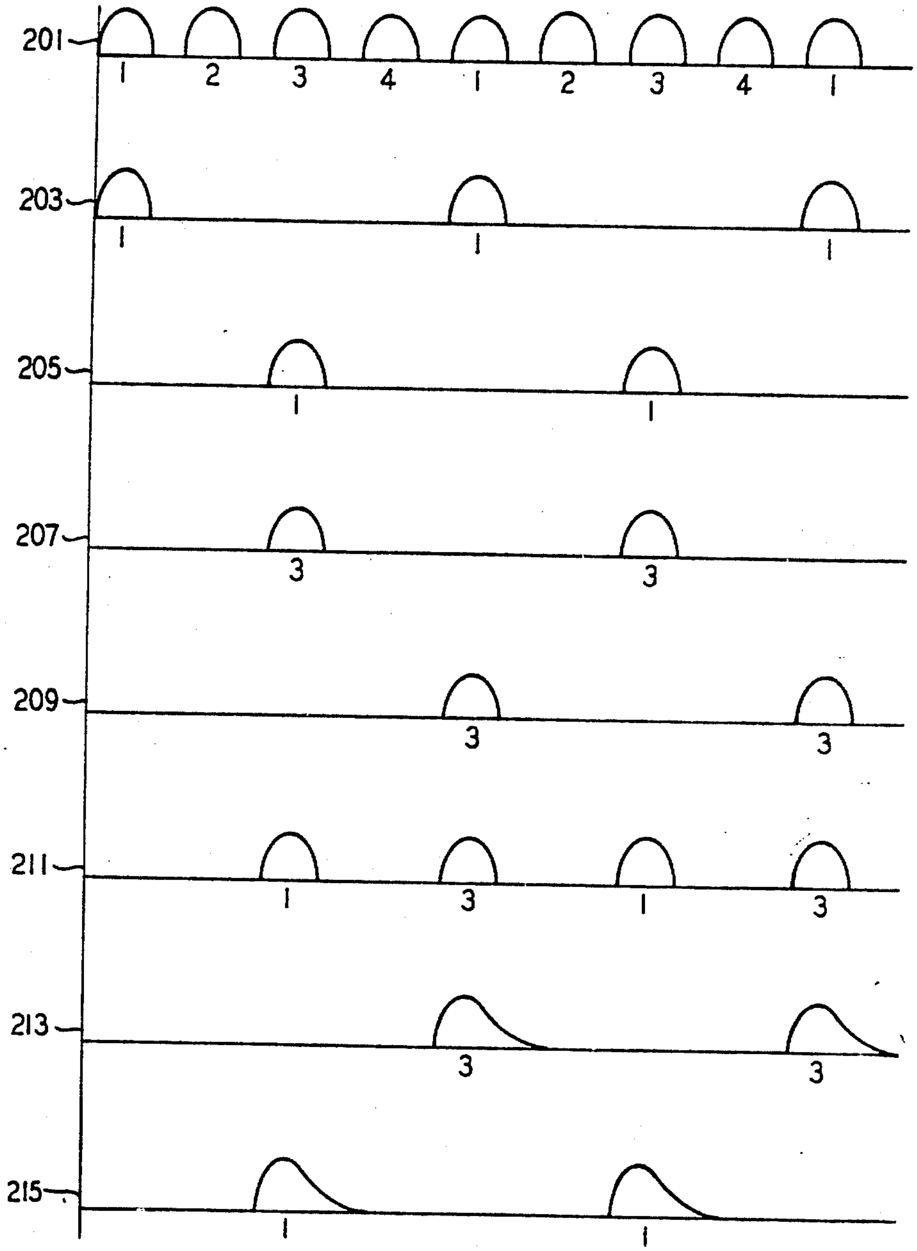
FIG. 2 illustrates waveforms useful in explaining the operation of the optical time division switching system of FIG. 1.

Waveform 201 on FIG. 2 shows the light pulses applied to each of the modulators of FIG. 1. For purposes of illustration, it is assumed that $n$ equals 4 and that four modulators are used. The first pulse on waveform 201 is the light applied to modulator $3_1$, and the fourth pulse of waveform 201 is the light applied to modulator $3_n$ which, in this case, is modulator $3_4$. Each of these light pulses defines a time slot during which the light incident on a modulator may be modified by electrical signals from its associated station. At the end of the fourth time slot, the fourth pulse on waveform 201, the time interval is completed and the cycle of time slots is repeated.

To illustrate the operation of the optical time division switching system of FIG. 1, assume that station $1_1$ is interconnected to station $1_3$ through the optical switching system. The pulse numbered 1 of waveform 203 is then applied to modulator $3_1$ which pulse is modified by a relatively slowly varying electrical signal applied from station $1_1$ via lead 131. The modulated light pulse from modulator $3_1$ is then applied to delay element $5_1$. An electrical signal from common control 121 controls delay $5_1$ so that there is a delay of time slots. Thus, the light pulse output from delay element $5_1$ appears in the third time slot of each cycle. The pulses from delay element $5_1$ are illustrated in waveform 205.

The light pulse applied to modulator $3_3$ is shown on waveform 207. This light pulse is modified by an electrical signal from station $1_3$ and delayed two time slots in delay element $5_3$ in response to an electrical signal from common control 121. The delayed light pulse is shown on waveform 209 and is coincident with time slot 1 of the second time interval of waveform 201. The light pulses from delays $5_1$ and $5_3$ are sequentially applied to light beam combiner 114 so that they form a common light beam retaining the delayed sequence as shown on waveform 211. Light beam distributor 119 sequentially applies the common light beam to detectors $7_1$ through $7_n$. The light pulse in time slot 1 is applied to detector $7_1$ and the light pulse in time slot 3 is applied to detector $7_3$. This is so because clock 123 controls both distributors 112 and 119 so that they operate in synchronism. Thus, as shown on waveform 213, the delayed light pulse originating in time slot 3 is applied to detector $7_1$ in time slot 1 and the delayed light pulse shown on waveform 215 originating in tim slot 1 is applied to detector $7_3$ in time slot 3. Detector $7_1$ converts the modulated light pulse applied to it an electrical signal which is transmitted to station $1_1$ via lead 133; and in like manner, the electrical signal from detector $7_3$ is applied to station $1_3$. In this way, signals are exchanged between stations $1_1$ and $1_3$.

It is to be understood that the length of common bus 116 is such that the light pulses applied to distributor 119 are substantially in phase coincidence with the time slots determined by clock 123 or that arrangements, well known in the art, are incorporated to account for phase differences. It is to be further understood that not only a pair but a plurality of pairs of stations from stations $1_1$ through $1_n$ may be concurrently interconnected so that signals may be exchanged between each pair and that interference between connections may be avoided by suitable optical isolation arrangements of modulators and detectors.

Figure 3:
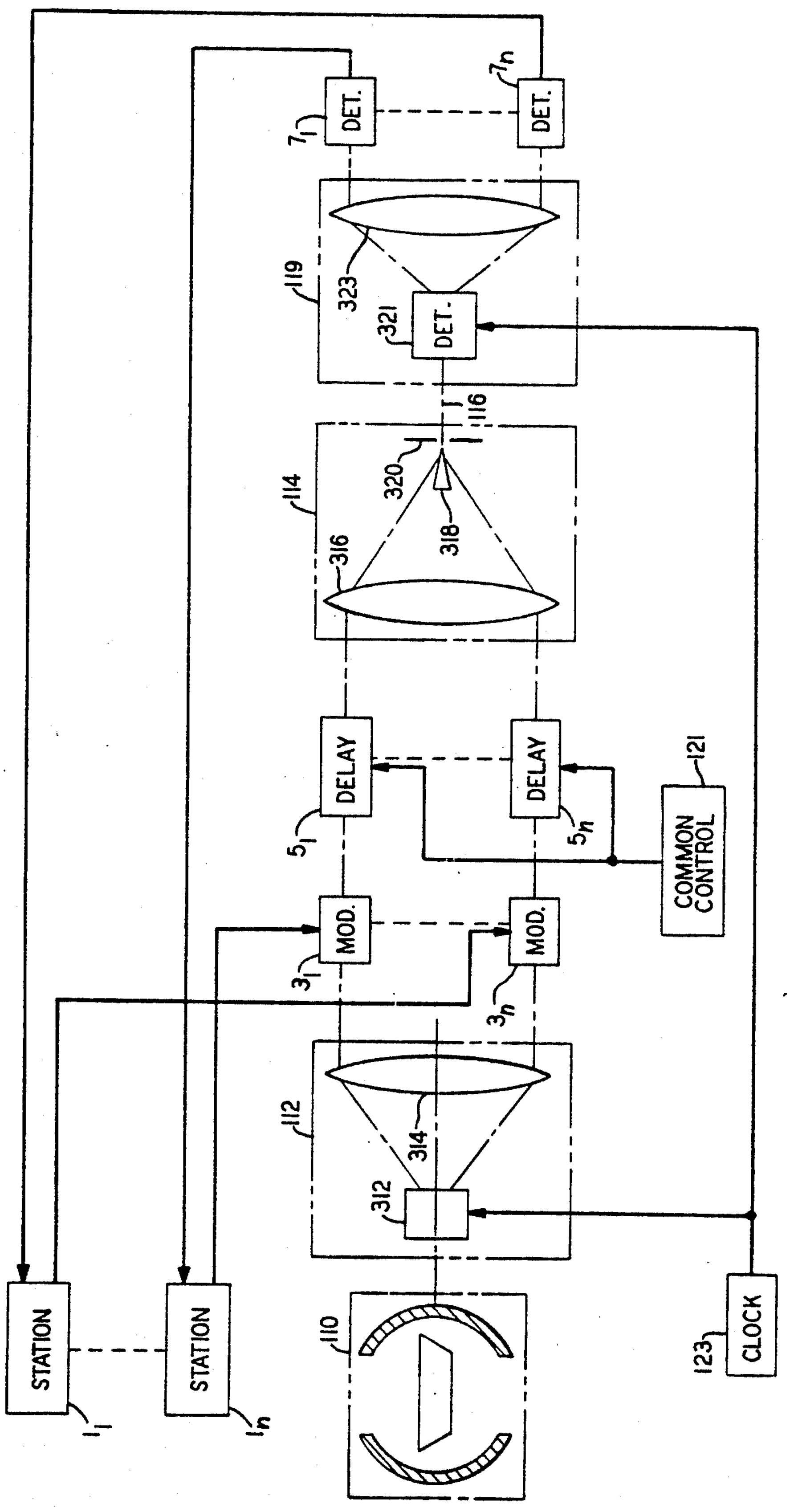
FIG. 3 depicts one illustrative embodiment of my invention in which a continuous wave laser source is used.

Referring to FIG. 3, the coherent light source 110 is a continuous wave laser, well known in the art. The light beam emerging from laser 110 is directed to deflector 312 which forms a part of coherent light distributor 112. Deflector 312 may be an electro-optic-type deflector although other types of deflectors can be used. Clock 123 in FIG. 3 consists of a pair of conventional sinusoidal signal generators capable of producing a pair of output signals of the same frequency and the same amplitude but 90° out of phase. These sinusoidal signals are applied to deflector 312 so that they are electrically and spacially orthogonal to each other. In response to the orthogonal sinusoidal signals, the light beam passing through deflector 312 is simultaneously angularly deflected and rotated in accordance with the frequency of the applied electrical signals. Since the angular deflection experienced by the light beam may be small during one pass trough deflector 312, an arrangement of mirrors ma be used to provide multiple deflections before the light beam emerges from deflector 312 so that the deflected angle can be increased. A method for multiple deflection of a light beam which may be used with this invention is disclosed in S. J. Buchsbaum-R. Kompfner patent application Ser. No. 631,301, now Pat. No 3,506,834, filed Apr. 17, 1967 and assigned to the same assignee. It is to be understood that other techniques for rotatively deflecting a light beam may also be used.

The conically rotating light beam emerging from deflector 312 is applied to lens 314 which lens angularly deflects the incoming beam so that the beam emerging therefrom describes a cylindrical path about a line through the center of deflector 312. Modulators $3_1$ through $3_n$, as hereinbefore described, are arranged in a circular pattern to receive the rotating light beam. The light beam is sequentially and repeatedly applied to the modulators $3_1$ through $3_n$ in time intervals each comprising a cycle of time slots. The light pulses energy from the modulators modified by the electrical signals from the associated stations $1_1$ through $1_n$ and these light pulses are then sequentially applied to delays $5_1$ through $5_n$.

Figures 6, 8:
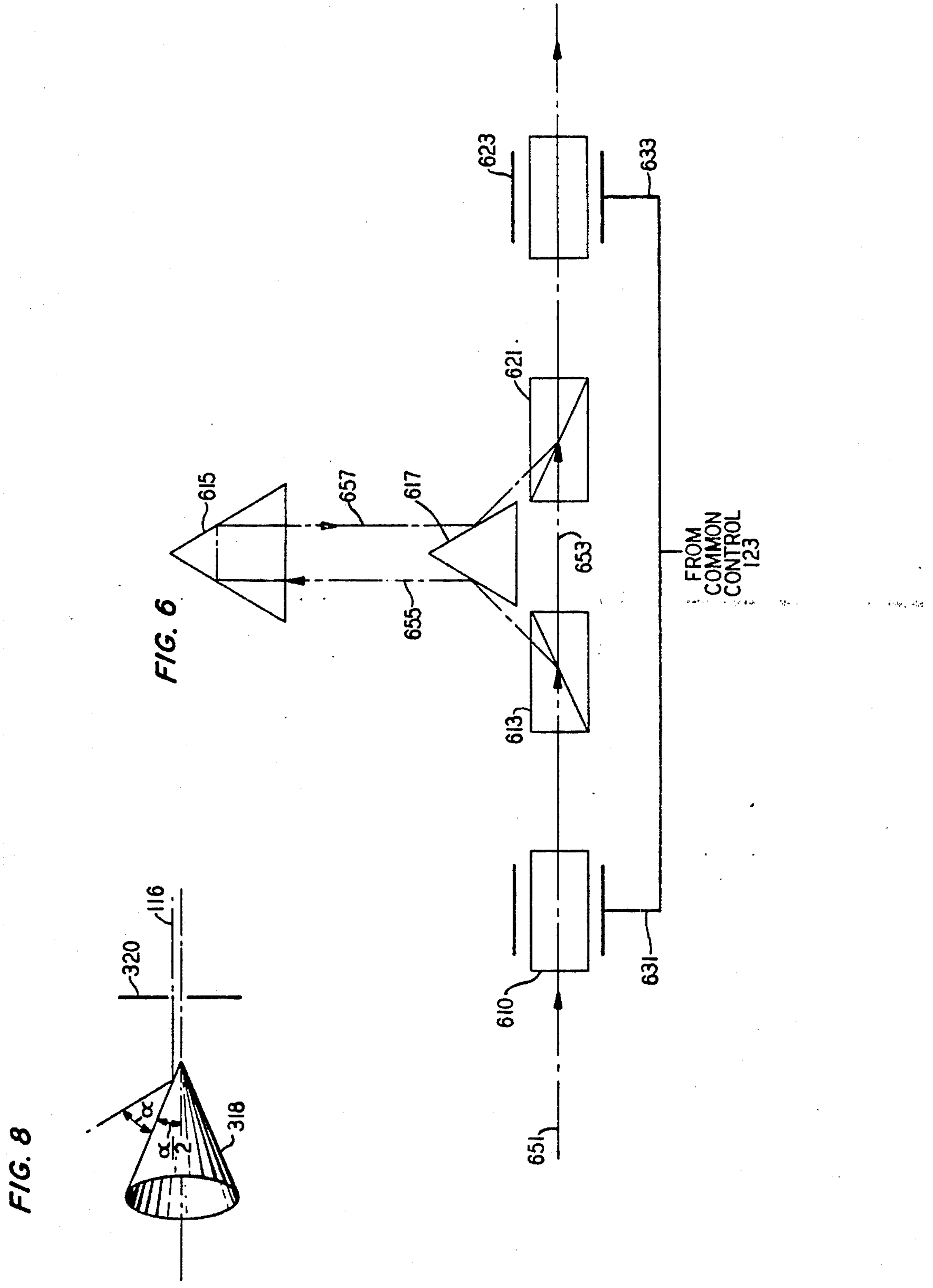
FIG. 6 illustrates the operation of a variable delay element useful in the illustrative embodiment of my invention.
FIG. 8 shows a reflective cone type of light beam combiner useful in he illustrative embodiments of FIGS. 3 and 4.

An example of a delay element which may be used in FIG. 3 is shown in FIG. 6. In this illustrative arrangement it is assumed that the incoming light from one of modulators $3_1$—$3_n$ along path 651 is circularly polarized. In response to a preselected electrical signal from common control 123 via lead 631, electro-optics device 610 selectively changes the polarization of the incoming beam so that it is either vertically polarized or horizontally polarized. If the beam emerging from device 610 is vertically polarized, it passes directly through devices 613 and 621 and is again circularly polarized in device 623. In this instance, a minimum delay is experienced by the instant light beam. If, however, the signal from common control 123 horizontally polarizes the instant light beam, it is deflected from device 613 to prism 617 and transmitted via path 655 to prism 615. The beam from prism 615 goes along path 657 to prism 617 and is deflected therefrom to device 621. In transversing paths 655 and 657, the light beam is delayed in accordance with the distance between prisms 615 and 617. This delay may be appropriately adjusted to correspond to a selected number of time slots or, preferably, form part of a sequential array of delays which can be selectively controlled by common control 123. The delayed beam reflected from prism 617 is deflected in device 621 and circularly polarized in device 623 so that it may be applied to light beam combiner 114. While a cascaded arrangement of these optical delays must be used to provide a selectable delay element, it is to be understood that other types of delay elements such as a switchable arrangements of mirrors may be used in the illustrative embodiment depicted in FIG. 3.

In FIG. 3, light beam combiner 114 consists of deflecting lens 316 which directs the modulated and delayed light pulses from delays $5_1$ through $5_n$ to conically reflecting surface 318. As illustrated in FIG. 8, conically reflecting surface 318 reflects the impinging light pulses so that these pulses travel along common transmission path 116 in a sequence determined by the selective control of the delay elements $5_1$—$5_n$. Assume, for purposes of illustration, that the light beam from lens 316 makes an angle $\alpha$ with axis of conically reflecting cone 318 and that the conical surface of cone 318 makes an angle of $\alpha/2$ with the aforementioned axis. Under these circumstances, a portion of the light beam is deflected through an angle $\alpha$ and is directed through aperture plate 320 to path 116. Thus, the modulated and delayed light pulses are sequentially applied to path 116 to form a common light beam. This is so because of the sequential rotation of the light beam through modulator $3_1$ through $3_n$ and delays $5_1$ through $5_n$.

The common light beam traveling along path 116 consists of a selected sequence of light pulses which are distributed to detectors $7_1$ through $7_n$ in a manner that permits the exchange of signals between interconnected pairs of stations. Since delays $5_1$ through $5_n$ have arranged the light pulse sequence in the appropriate time slots for distribution to the intended interconnected stations, it is only necessary that the common light beam be conically deflected in synchronism with the deflection in deflector 312 so that the rotating light beam from lens 314 enters modulator $3_1$ at the same time as the rotating light beam from lens 323 enters detector $7_1$. The delayed sequence of light pulses impinges on detector $7_1$ through $7_n$ under control of common control 121 and the desired signal exchanges is accomplished.

Deflector 321 and lens 323 form light beam distributor 119 which operates to separate the light pulses from the common light beam on path 116. The conical rotation takes place in deflector 321 under control of clock 123. As hereinbefore described with respect to deflector 312, deflector 321 may be a multiple pass electro-optic deflector to which orthogonal electrical signals of equal amplitude and equal frequency are applied. The rotating light beam emerging from deflector 321 deflected in lens 323 so that it is sequentially applied to detectors $7_1$ through $7_n$ in time slots which correspond to the receipt of the light beam by modulators $3_1$ through $3_n$. Each pulse is then applied to detectors $7_1$ through $7_n$ in a prearranged sequence of time slots. If a light pulse emerges from modulator $3_1$ in time slot 1, for example, it may be delayed for $n$−1 time slots in delay element $5_1$. As a result of the action of deflector 321, it will be applied during time slot $n$ to detector $7_n$. In this way, a signal from station $1_1$ is transmitted to station $1_n$. In accordance with my invention delay elements $5_1$ through $5_n$ operate in response to common control 121 to determine the selected sequence of the common beam on path 116 so that signals may be exchanged between selected pairs of stations of a communication system.

Figure 4:
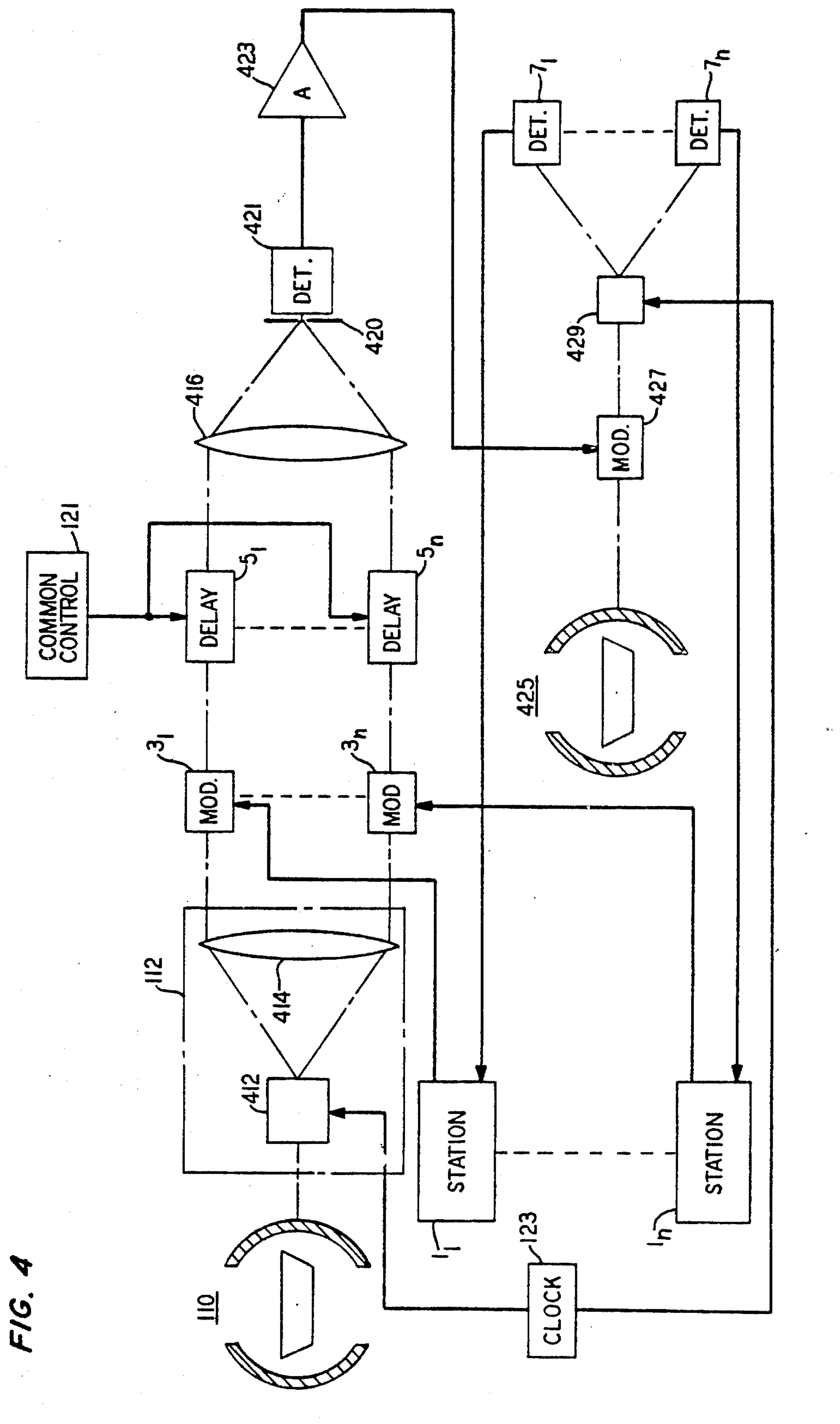
FIG. 4 depicts another illustrative embodiment of my invention in which a pair of continuous wave laser sources are used.

FIG. 4 shows another illustrative embodiment of my invention in which two continuous wave lasers are used. Laser 110 provides a beam of coherent light which is directed to deflector 412 under control of clock 123 as hereinbefore described. After the rotating beam has been modulated and delayed in the manner described with reference to FIG. 3, the selected sequence of light pulses of the common light beam are applied to detector 421 via lens 416 and aperture 420. It is to be understood that a conical deflector may be inserted between lens 416 and aperture 420 so that a common light beam path is formed. The detector converts the light pulse sequence to a sequence of electrical signals that are amplified in amplifier 423. The second continuous wave laser 425 applies a second coherent light beam to modulator 427. In response to the electrical signals from amplifier 423, modulator 427 varies the amount of light which is applied during a separate time slot, the output of modulator 427 is a sequence of modulated light pulses which corresponds to the light pulses impinging on detector 421. The light beam received by detector 421 may have been attenuated by the rotary deflection, modulation and delay. But, because of the electrical amplification in amplifier 423, the modulated light beam from modulator 427 can provide an increased amount of modulated light to deflector 429.

Deflector 429 conically rotates the beam applied thereto so that the individual light pulses may be separated and applied to detectors $7_1$ through $7_n$ in the time slots assigned under control of common control 121 through delays $5_1$ through $5_n$. As in FIG. 3, the conical deflection of deflectors 412 and 429 are synchronized so that a common set of time slots is defined for modulators $3_1$ through $3_n$ and detectors $7_1$ through $7_n$.

Figure 5:
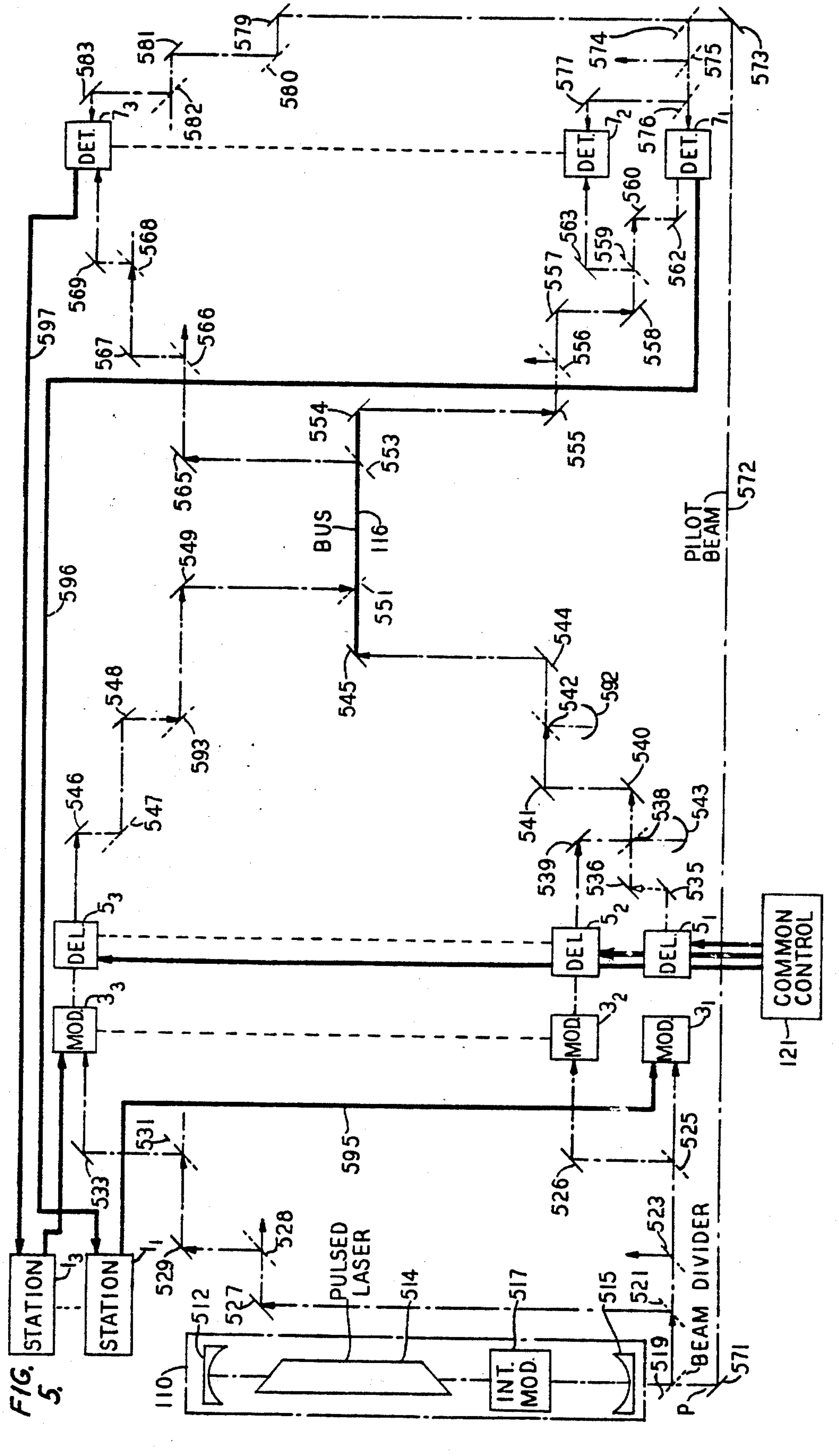
FIG. 5 depicts yet another illustrative embodiment of my invention in which pulsed coherent light is used.

In FIG. 5, coherent light source 110 is an internally modulated or self-pulsing laser oscillator. The pulsing laser oscillator 514 and reflecting mirrors 512 and 515 produce a number of oscillation modes. Internal modulator 517 couples these modes together and provides a repetitive sequence of short duration light pulses at a rate associated with the round trip delay in the laser. These pulses are applied through mirror 515 to the rest of the optical time division switching system in FIG. 5.

Each coherent light pulse is directed by an arrangement of beam dividers and mirrors to modulators $3_1$ through $3_n$. Beam divider 519, as well as the other beam dividers shown on FIG. 5, may be half-reflecting mirrors which reflect one-half of the applied coherent light and allow one-half of the applied light to pass therethrough. It is to be understood, however, that other types of optical dividers may be used. A portion of the light pulse from divider 519 is applied to modulator $3_1$ through beam dividers 521, 523 and 525. A portion of the light pulse from divider 525 is directed towards mirror 526 and reflected therefrom to modulator $3_2$. The lengths of the light paths from divider 519 to modulators $3_1$—$3_n$ are arranged so that the original light pulse is sequentially applied to the modulators during successive time slot periods. As illustrated in FIG. 5, the light paths from divider 519 to modulators $3_1$ and $3_2$ permit a portion of the light pulse from source 110 to be first applied to modulator $3_1$ and another portion then to modulator $3_2$. This is true because of the additional light path between mirror 526 and modulator $3_2$. Beam divider 523 allows a portion of the original light pulse to be applied to other modulators along paths, not completely shown, so that the sequence of time slots is maintained and beam divider 521 provides a portion of the original light pulse to modulators including $3_n$. The light from divider 521 is reflected in mirror 527, divider 528, mirror 529, divider 521, and mirror 533 so that it is directed towards modulator $3_n$ in the *n*th time slot. Divider 528 allows a portion of the applied light pulse to be transmitted to other modulators in accordance with the sequence of time slots.

After a repetitive cycle of time slots have been completed, the next light pulse from source 110 is applied to divider 519 and is divided by the arrangement of dividers and mirrors between divider 519 and modulators $3_1$ through $3_n$ so that light pulses are successively applied to modulators $3_1$ through $3_n$ in the next group of time slots. Where *n* modulators are used, the light pulse is divided *n* times and 1/*n*th of the applied light pulse is transmitted to each modulator.

Electrical signals from station $1_1$ are transmitted to modulator $3_1$ via lead 595 to control the amount of light emerging from modulator $3_1$. In like manner, the rest of stations $1_1$ through $1_n$ provide signals to control the amount of light emerging from their associated modulators. If station $1_1$ is to be selectively interconnected to station $1_n$, common control 121 applies a signal to variable delay element $5_1$ so that the light emerging from delay $5_1$ appears in time slot *n*. This requires a delay of *n*–1 time slots. Common control 121 also applies a signal to delay element $5_n$ to delay the light pulse from modulator $3_n$ one time slot. By means of variable delay elements $5_1$—$5_n$ under control of common control 121, a selected sequence of light pulses from delays $5_1$ through $5_n$ is provided in accordance with my invention.

In order that the selected sequence be maintained, it is required that the delay experienced by each light pulse in the mirror and divider arrangement between delays $5_1$ through $5_n$ and bus 116 be equal. As shown, the light pulse from delay $5_1$ is reflected by mirrors 535 and 536 and a portion thereof is applied to mirror 540. The light pulse from delay $5_2$ is applied through mirror 539 and divider 538 to mirror 540. As can be seen from FIG. 5, the light path for each of these pulses is equal in length. Therefore, the selected sequence between the pulses from delays $5_1$ through $5_2$ is maintained. A portion of the light emerging from divider 538 is not directed toward mirror 540. This portion of light must be absorbed to prevent interference between light pulses from occurring. This is done in absorber 543 which may comprise a nonreflecting surface well known in the art.

The light pulses from delays $5_1$ and $5_2$ are transmitted via mirrors 540, 541, divider 542, mirrors 544 and 545, and divider 551 to bus 116. Absorber 592 prevents reflection of light from divider 542. The light pulse from delay $5_n$ is transmitted along the path controlled by mirror 546, divider 547, mirror 548, divider 593, mirror 549, and divider 551 to bus 116. These mirrors, dividers, and associated absorbers (not shown) are arranged so that the delay experienced by the light pulses from delay $5_n$ is identical to the delays of the light pulses from delays $5_1$ and $5_2$. Thus, the sequence of light pulses determined by common control 121 is maintained in the common light beam applied to bus 116. The beam dividers included in these light paths permit combining of light pulses from different modulators in the same manner as shown for the light pulses from delays $5_1$ and $5_2$.

The common light beam from bus 116 is distributed to detector $7_1$ through $7_n$ by means of the paths provided by the mirror and beam divider arrangement shown therebetween on FIG. 5. As previously discussed with respect to the combining of light pulses between delays $5_1$ through $5_n$ and bus 116, the distribution of the light pulses must be done in a manner that retains the selected sequence of the light pulses as provided by delays $5_1$ through $5_n$. Thus, the paths between beam divider 553 and each of detectors $7_1$ through $7_n$ must be equal in length. Each light pulse from beam divider 553 is applied to mirrors 554, 555, divider 556, mirrors 557 and 558, divider 559, and mirrors 560 and 562 and is thereby transmitted to detector $7_1$. Beam divider 559 allows a portion of the light pulse to be applied to detector $7_2$ via mirror 563. As shown in FIG. 5, the paths between divider 553 and detectors $7_1$ and $7_2$ are equal length. The light pulse from divider 553 is also transmitted via mirror 565, divider 566, mirror 567, divider 568 and mirror 569 to detector $7_n$. This path is also he same length as the paths to detector $7_1$ and $7_2$. Dividers 556 and 566 allow a portion of the light pulses to be applied to other detectors.

As described, a portion of each light pulse from bus 116 is simultaneously transmitted to all of the detectors $7_1$ through $7_n$. If the detectors directly converted the incident light pulses to electrical signals, each of stations $1_1$ through $1_n$ would receive all light pulses transmitted through the system. In the illustrative embodiment of FIG. 5, this is prevented by making each detector responsive only to the concurrent application of the modulated light pulses and pulses from pilot beam 572. The portion of the light pulses from source 110 passing through beam divider 519 are directed by mirror 571 to mirror 573 and are distributed therefrom to each of the detectors in the same sequence of time slots as that used to apply light pulses to modulators $3_1$ through $3_n$. This is done through an arrangement of beam dividers and mirrors that is substantially similar to that described with respect to modulators $3_1$ through $3_n$. Thus, the pilot pulses are transmitted through beam dividers 574, 575, 576 to detector $7_1$. A portion of the pilot pulse impinging on divider 576 is diverted to mirror 577 and applied therefrom to detector $7_2$. The path length between divider 576 and detector $7_2$ corresponds to the time interval of one time slot. A portion of the pilot pulse from divider 574 is transmitted via mirror 579, divider 580, mirror 581, divider 582 and mirror 583 to detector $7_n$. The length of this last-mentioned pilot pulse path is arranged so that the pilot pulse applied to detector $7_n$ appears during time slot *n*. Beam dividers 575, 580 and 582 permit a portion of the pilot pulses to be transmitted to the other detectors via paths not shown on FIG. 5 in the desired sequence of time slots.

In order to exchange signals between stations $1_1$ and $1_n$ it is required that the light pulse from delay $5_n$ be detected in detector $7_1$. This occurs if there is a delay of one time slot in delay $5_n$. Because of the one time slot delay, the modulated light pulse from delay $5_n$ and the pilot pulse in the next succeeding time slot both are applied to detector $7_1$ in the first time slot of the next cycle. In this time slot only detector $7_1$ is enabled to transmit a signal to station $1_1$. In response to the concurrent application of the light pulse and the pilot pulse, detector $7_1$ causes an electrical signal to be transmitted to station $1_1$ over lead 596. In like manner, the light pulse from delay $5_1$, which is delayed *n*–1 time slots, appears at detector $7_n$ simultaneously with the pilot pulse in time slot *n* of the same cycle of time slots and detector $7_n$ causes an electrical signal to be transmitted to station $1_n$ via lead 597.

As shown in the illustrative embodiment of FIG. 5, the delay elements are inserted in the path of the modulated light pulses. It is to be understood that other arrangements of the delay elements are possible. For example, the delay elements may be omitted from the light path between the modulators and the common bus and be inserted in the light paths between the pilot pulses and the detectors just prior to the detectors. In such an arrangement, the pilot pulses would be delayed appropriately in accordance with a common control so that the sequence of modulated light pulses can be gated from detectors $7_1$–$7_n$ in the selected sequence whereby stations $1_1$–$1_n$ may be selectively interconnected.

Figure 7:
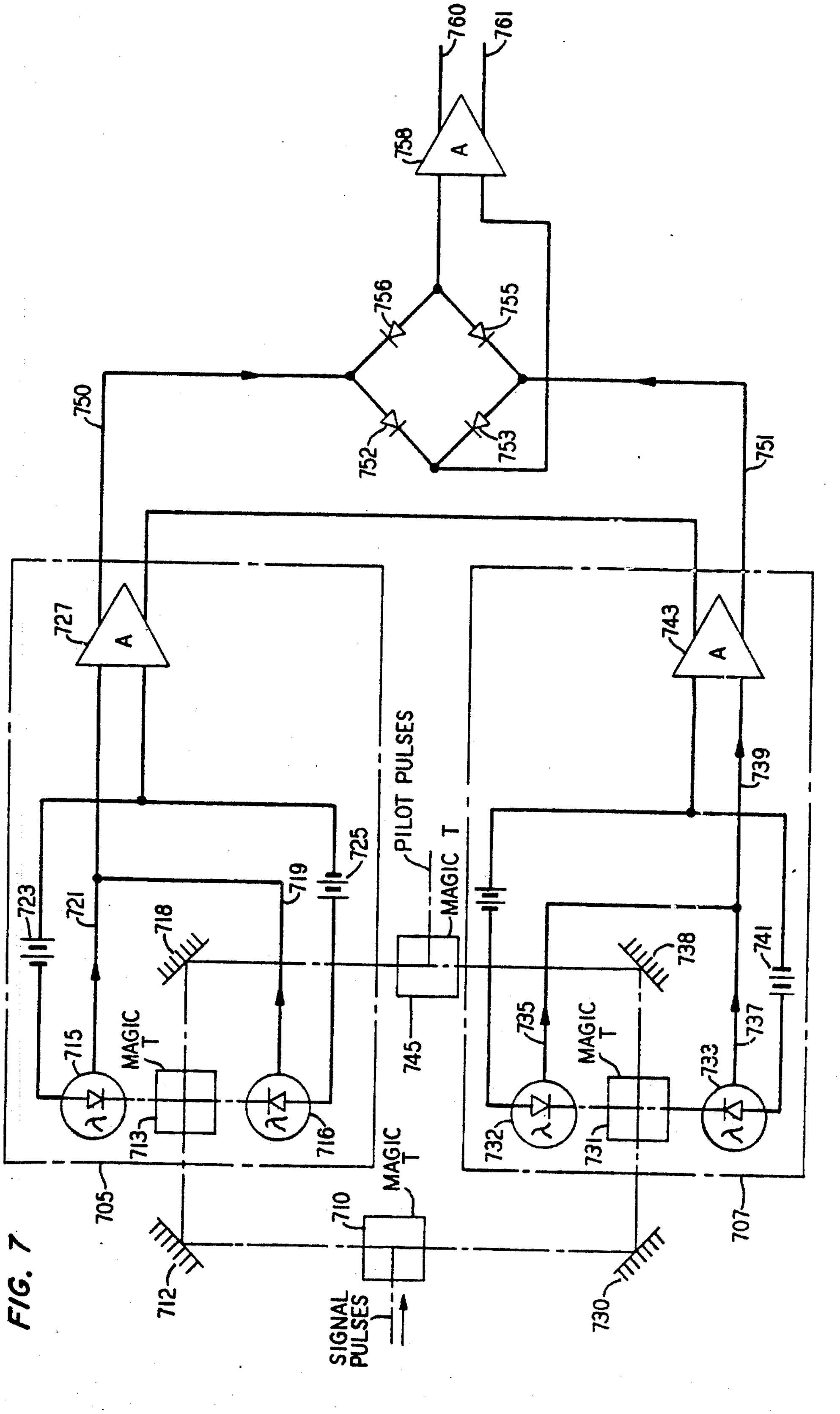
FIG. 7 illustrates a photodetector circuit which may be used in the illustrative embodiment of FIG. 5.

The detectors $7_1$ through $7_n$ of FIG. 5 may be of the type illustrated in FIG. 7. In FIG. 7, the modulated light pulses are applied to Magic Tee 710. This Tee divides the incoming signal into two parts. One part is directed to circuit 705 and the other part is directed toward circuit 707. As is well known in the art, the Magic Tee circuit may be used to divide an incoming electromagnetic signal into two parts that are antisymmetrical, i.e., oppositely phased. The portion of the output signal from Magic Tee 710 which is applied via reflecting mirror 712 to circuit 705 is in phase with the incoming signal and the portion applied via reflecting mirror 730 to circuit 707 is 180° out of phase of the incoming signal. The pilot pulses hereinbefore referred to with respect to FIG. 5 are applied to Magic Tee 745 which directs a portion thereof via reflecting mirror 718 to circuit 705 and a second portion via mirror 738 to circuit 707.

The light path for the pilot pulses is arranged so that there is a quarter wavelength difference between the signals from Magic Tee 710 and Magic Tee 745. This quarter-wave phase difference causes the pilot pulses applied to circuit 705 to lag the modulated pulses applied thereto by 90° and causes the pilot pulses applied to circuit 707 to lead the modulated pulses applied thereto by 90°. Magic Tee 745 provides an in-phase component of the pilot pulses for Magic Tee 713 and an out-of-phase component for Magic Tee 731.

In circuit 705, the pilot pulse and the modulated incoming light pulses are combined in Magic Tee 713 so that the incoming component of the modulated light pulses directly in phase with the pilot pulses from mirror 718 are applied to photodetector 715. The 180° out of phase modulated pulses, and the pilot pulses are applied to photodetector 716. Photodetectors 715 and 716 are electrically biased by voltage sources which are represented by batteries 723 and 725, and the outputs of these photodetectors responsive to the light applied thereto are transmitted to amplifier 727. The output current $i_1$ from photodetector 715 is equal to $$\eta\frac{e}{h\nu}\left[\left(\frac{1}{2}S\right)^{\frac{1}{2}}+\left(\frac{1}{2}P\right)^{\frac{1}{2}}\right]^2 \qquad (1)$$

where $S$ represents the incoming light pulse, $P$ represents the incoming pilot pulse, $e$ is the charge of an electron, $h$ is Plank's constant, $\nu$ is the frequency of the incoming signal and pilot pulse beams and $\eta$ is the photodetector efficiency. The current $i_2$ from photodetector 716 is $$\eta\frac{e}{h\nu}\left[\left(\frac{1}{2}S\right)^{\frac{1}{2}}-\left(\frac{1}{2}P\right)^{\frac{1}{2}}\right]^2 \qquad (2)$$

This is so because the out of phase component of the modulated light is applied to detector 716. The difference between $i_1$ and $i_2$ transmitted to amplifier 727 is $$i_1-i_2=\frac{2\eta e}{h\nu}(S\cdot P)^{\frac{1}{2}} \qquad (3)$$

It is readily seen from Equation (3) that an output from amplifier 727 is obtained only if both the incoming signal pulses and pilot pulses are present and are in phase. Thus, the pilot pulse is effective to gate the signal pulse occurring in the time slot associated with the pilot pulse. If circuit 705 were used alone as a detector circuit, any phase differences between the modulated light pulses and the pilot pulses would substantially interfere with its operation. Phase differences could result from temperature changes in the paths of the light pulses for the $S$ and $P$ signals.

By using both circuits 705 and 707, the outputs of which are orthogonally related as hereinbefore described, it is possible to recombine the orthogonal components from circuits 705 and 707 so that it is no longer necessary to maintain the accurate phase relationship between incoming signals and pilot pulses. The outputs of amplifiers 727 and 743 are applied to opposite arms of the rectifier bridge utilizing diodes 752, 753, 755 and 756. The input of amplifier 758 is connected across the remaining junctions of the bridge. Since the outputs from amplifiers 727 and 743 are orthogonally related, the voltage applied between the junction of diodes 752 and 756 and the junction of diodes 753 and 755 may be expressed as $$S^{\frac{1}{2}}\sin\theta - S^{\frac{1}{2}}\cos\theta \qquad (4)$$

where $P$ from Equation (3) is unity and $\theta$ represents the phase difference between $S$ and $P$. When the signal from amplifier 727 is positive and the signal from amplifier 743 is negative, diodes 752 and 755 conduct and the resulting output is applied to amplifier 758. When the signal from amplifier 743 is positive and the signal from 727 is negative, diodes 753 and 756 conduct and apply a signal of the same polarity to amplifier 758. Thus, the absolute magnitude of the input signal to the diode bridge is applied to amplifier 758. This absolute magnitude may be approximated by the square of the applied voltage in accordance with the well-known principles of rectifier diode bridges. The signal applied to amplifier 758 then has a DC component which, as can be calculated by well-known Fourier analysis techniques, is proportional to the signal $S$. Thus, the detector of FIG. 7 operates to produce an electrical signal corresponding to the gated modulation signal applied to modulators $3_1$–$3_n$ regardless of the phase relationship between the pilot pulses and the modulated light pulses.

Although the invention has been described with reference to particular embodiments, it is to be understood that the arrangements disclosed are merely illustrative of the principles of the invention. Numerous modifications may be made therein and other arrangements may be devised without departing from the spirit and scope of the invention.

What is claimed is:

1. An optical time division switching system comprising a plurality of stations, a distinct modulator and a distinct detector connected to each of said stations, a source of coherent light, means for defining repetitive time intervals, first light-directing means for directing light from said source to each of said modulators in succession during a distinct one of said time intervals, means for applying input signals to each of said modulators from the station connected thereto to modulate the light received from said source, means for gating light from said modulators to form light pulses in a selected sequence, means for combining the outputs of said gating means into a single light beam retaining said selected sequence, second light-detecting means for directing light pulses from said beam to each of said detectors in succession, and means for enabling said detectors to apply signals corresponding to said input signals to their connected stations comprising means for demodulating the light received in each of said detectors during said one distinct time interval.

2. An optical time division switching system according to claim 1 wherein said means for defining repetitive time intervals further comprises means for defining a succession of time slots in each of said intervals, each of said time slots being associated with the operation of one of said modulators, and said light-gating means comprises variable delay elements for delaying the light from said modulators for a selected number of said time slots whereby said stations are selectively interconnected for signal transfer therebetween.

3. An optical time division switching system according to claim 2 wherein each of said variable delay elements comprises a cascaded arrangement of selectable length light delay paths.

4. An optical time division switching system according to claim 2 wherein said coherent light source comprises a first continuous wave laser for emitting a coherent light beam, said time interval defining means comprises means for angularly rotating said coherent light beam along a conical path, said modulators being located along the circumference of a circular path, and said first light-directing means comprises means for deflecting said coherent light beam from said conical path to impinge on said modulators in said succession of time slots.

5. An optical time division switching system according to claim 4 wherein said combining means comprises conical reflecting means and means for deflecting said light pulses from said variable delay means onto said conical reflecting means at a constant angle, said conical reflecting means being operative to form a single light beam comprising said light pulses in said selected sequence.

6. An optical time division switching system according to claim 4 further comprising means for converting said light pulses from said single light beam into electrical signals, a second continuous wave laser, and means inserted between said second continuous wave laser and said second light directing means responsive to said electrical signals for modulating the coherent light from said second continuous wave laser.

7. An optical time division switching system according to claim 4 wherein said second light-directing means comprises means for angularly rotating said single light beam along a conical path in synchronism with said coherent light angularly rotating means whereby the modulated light pulses in the time slots corresponding to each one of said stations are applied to the detector connected to said one of said stations.

8. An optical time division switching system according to claim 7 wherein said time interval defining means comprises means for generating a pair of orthogonally related single frequency signals and means for applying said signal pair to said single light beam angularly rotating means and to said coherent light angularly rotating means.

9. An optical time division switching system comprising a plurality of stations, a distinct modulator and a distinct detector connected to each of said stations, means for generating a sequence of coherent light pulses defining repetitive time intervals, first means for directing each of said light pulses to said modulators in a succession of time slots during a distinct one of said time intervals, means for applying signals to each of said modulators from the station connected thereto to modulate said light pulses, means for gating light from said modulators in a selected sequence, means for combining the outputs of said gating means into a single light pulse beam retaining said selected sequence, second means for directing light pulses from said beam simultaneously to each of said detectors, and means for enabling said detectors in said succession of time slots to apply signals corresponding to said input signals to their connected stations whereby said stations are selectively interconnected for signal transfer therebetween.

10. An optical time division switching system according to claim 9 wherein said first light-pulse-directing means comprises a plurality of means each for directing a portion of said light pulse along a path of predetermined length to each modulator, said paths between said generating means and successive modulators being separated by a distance corresponding to the duration of one of said time slots.

11. An optical time division switching system according to claim 10 wherein said combining means comprises means for directing each gating means output to a common transmission path over paths of equal length between each gating means output and said common transmission path.

12. An optical time division system according to claim 11 wherein said second light-pulse-directing means comprises a plurality of means connected between said common transmission path and said detectors each for directing said light pulse beam along equal length paths to one of said detectors.

13. An optical time division switching system according to claim 9 wherein said detector enabling means comprises means for sequentially directing a portion of said coherent light pulses from said generating means to said detectors in said succession of time slots synchronously with the light pulses of said first light-pulse-directing means.